Oct. 27, 1970  F. GRASENICK ET AL  3,536,911
APPARATUS FOR PREPARING EMBEDDED SPECIMENS FOR EXAMINATION
WITH AN OPTICAL OR ELECTRON MICROSCOPE
Filed Sept. 25, 1967

INVENTORS
FRITZ GRASENICK
WOLFGANG GEYMAYER
ADOLF ALDRIAN
BY
ATTORNEYS

United States Patent Office 3,536,911
Patented Oct. 27, 1970

3,536,911
APPARATUS FOR PREPARING EMBEDDED SPECIMENS FOR EXAMINATION WITH AN OPTICAL OR ELECTRON MICROSCOPE
Fritz Grasenick, Wolfgang Geymayer, and Adolf Aldrian, all of 17 Steyrergasse, Graz, Austria
Filed Sept. 25, 1967, Ser. No. 670,228
Int. Cl. G01n 23/00; H01j 37/00
U.S. Cl. 250—49.5                    9 Claims

ABSTRACT OF THE DISCLOSURE

An apparatus for preparing embedded specimens, particularly for examination with an optical or electron microscope, comprises an evacuable receiver, which contains a smaller container for holding the embedding material.

SUMMARY OF THE INVENTION

Figure 1:
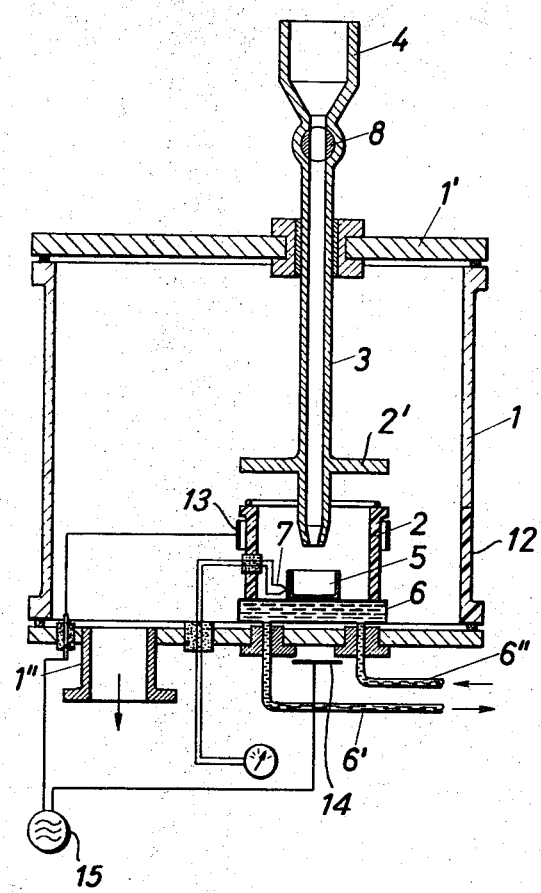

According to the present invention, an apparatus for preparing embedded specimens for examination with an optical or electron microscope comprises an evacuable receiver, which contains a smaller container. The smaller container is sealed from the receiver and provided with a feeder for feeding the specimen to be embedded into the interior of the container. The feeder is sealed from the receiver.

Embedded specimens are required for examinations carried out with an optical or electron microscope. Most of such specimens are made from organic substances in the widest sense of this term, including colloidal and biological systems. The preparation is usually carried out in such a manner that specimens which contain water, as is virtually always the case, are dehydrated by successive treatments with different solvents. The dehydrated specimens are treated with a substance which is capable of addition or condensation polymerization and which is in a monomeric state or has a relatively low degree of polymerization. This substance constitutes the embedding medium, which is subjected to addition or condensation polymerization when it has penetrated the specimen and encloses the same. Alternatively, the specimen may be dehydrated by freeze-drying. In this case, the water is removed from the deeply frozen specimen by vacuum sublimation before the specimen is impregnated with the embedding medium.

As dehydrating causes a certain denaturation of the specimens, certain fixing and staining agents are employed, although such agents may also change the specimens to a larger or smaller degree. In addition, it is difficult to obtain a uniform or optimum staining or fixation of certain specimens, such as cell systems.

The above-mentioned methods of freeze-drying and subsequent vacuum embedding have been adopted in order to avoid the above-mentioned difficulties encountered when the dehydration is effected by successive treatments with different solvents, because freeze-drying and subsequent vacuum embedding do not result in a denaturation or in a chemical change of the specimens. Besides, with porous specimens the embedding medium enters the finest interstices and pores so that air and any residual traces of water are removed. On the other hand, even this practice involves the following difficulty: As has been stated, the evacuation is to be followed by the impregnation with the embedding medium which is capable of addition or condensation polymerization and which is used for impregnation in a liquid monomeric state or in a state in which it is no longer monomeric but has a very low degree of polymerization and in any case a relatively high vapor pressure. When the embedding medium is introduced into the evacuable receiver, the medium will evaporate owing to its high vapor pressure until its saturation vapor pressure corresponding to the prevailing temperature has been reached. This results in a contamination of the walls of the receiver by the condensation of the medium on said walls and in a most undesirable and detrimental contamination of the vacuum pump. Moreover, the components having the lowest molecular weight are preferentially evaporated from the medium. These are the components which tend to reduce the viscosity of the medium and enable it to penetrate into the specimen. This evaporation of the components of low molecular weight may even cause the components having a higher molecular weight to settle out before they have had an opportunity to penetrate the specimen.

For considerations of vacuum technology and space, the receiver must have a certain minimum size so that there are limits to the obvious remedy to avoid the above-mentioned difficulty by using an evacuable receiver which is as small as possible. For instance, the receiver must contain cooling chambers, which represent additional structures on which the evaporated components of the embedding medium tend to condense.

The present invention relates to an apparatus by which the above-mentioned difficulties in the preparation of embedded specimens are avoided. These difficulties have previously prevented the use of this method on a scale which would be in accordance with its significance. To accomplish this object, it is an important feature of the invention that the apparatus comprises an evacuable receiver and a smaller container, which is inserted in said receiver and adapted to hold the specimen to be embedded, means for sealing said smaller container from the receiver, and feeders for the embedding medium, which feeders are sealed through the walls of the container and open into the same. The design of the apparatus according to the invention is based on the following consideration: If the specimen to be dehydrated by freeze-drying and to be embedded is accommodated in a small container, which has suitably a small depth and is disposed within the larger receiver, the whole system is then evacuated to dry the specimen, whereafter the initially open, small container is sealed and the embedding medium is then introduced only into the small container, the above-mentioned contamination of the receiver walls, the devices in the receiver, and the vacuum pump can no longer occur.

According to a further feature of the invention, the embedding medium is introduced into the sealed and evacuated, small container through a pipe, which is vacuum-sealed through said container and which communicates with a supply of the embedding medium. The introduction of the embedding medium into the evacuated small space will obviously result in the above-mentioned evaporation, but this will no longer be disturbing. In the small space, the saturation pressure will be reached before any disturbing settling out can occur. It is also a feature of the invention to provide an annular electrode for producing a high frequency discharge around the smaller container.

It will be understood that the concept of the invention may be embodied in various structural forms. Two of such embodiments are shown by way of example in the drawing, in which:

FIG. 1 illustrates an apparatus having a simple pipe, and

Figure 2:
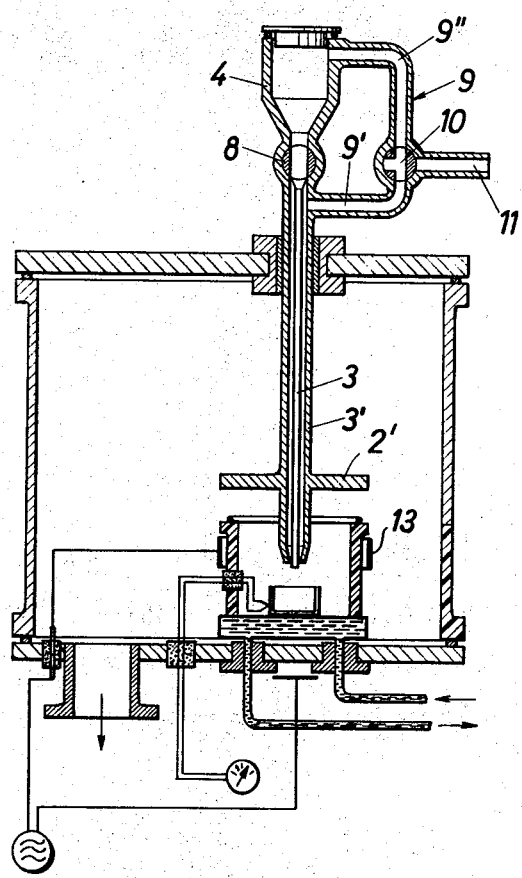

FIG. 2 an apparatus having two concentric pipes as a feeder.

The drawing shows a large, evacuable receiver 1 provided with a cover 1' and a vacuum conduit 1", which leads to the vacuum pump, not shown. A small container 2 for the specimen 5 to be embedded is inserted in the large receiver 1 and provided with a removable cover 2'. The feeder for the embedding medium consists, e.g., of a feed pipe 3, which is vacuum-sealed through the cover 2' and through the cover 1' and connected by a shut-off valve 8 to a supply 4 of the liquid embedding medium.

The specimen 5 is in heat-conducting relation with the heating or cooling device 6, which is represented as a container, which holds a liquid heat transfer medium, which is supplied at 6" and discharged at 6'. A temperature indicator is indicated at 7.

The function of the apparatus shown in the drawing is obvious in view of what has been stated before.

The apparatus according to the invention may be modified, e.g., as follows: Instead of providing a single pipe, which is vacuum-sealed through the cover or wall of the small specimen container, two pipes may be provided, which may be concentrically disposed one in the other, as is shown in FIG. 2. The embedding medium is supplied through one pipe 3 and embedding medium vapor through the other pipe 3' so that the liquid embedding medium enters the container when the same has already been saturated with vapor. In the embodiment shown, the outer pipe 3' is connected by a pipe bend 9 to the upper part of the supply reservoir 4 and transfers the vapor which is formed over the liquid embedding medium. In this way, it is possible to produce in the small container not only the saturation vapor pressure of the liquid embedding medium but even a higher pressure. This is of great advantage for the embedding, e.g., of porous substances. Alternatively, the second pipe may be used to introduce other gases into the container. For this purpose, a pipe 11 may be provided, which is connected by a three-way cock 10 to the pipe bend 9. Excited gases, such as excited oxygen, may be introduced through the pipe 11 to increase the wettability of the specimen with respect to the embedding medium. This may be accomplished as follows: The container is more or less tightly sealed from the receiver. Oxygen is introduced into the container in a certain amount, e.g., to increase the pressure from, e.g., $10^{-4}$ mm. mercury to about $10^{-2}$ mm. mercury.

This oxygen is then excited, e.g., by high frequency discharges, and acts on the specimen in the manner described. When the action has been performed, the communication with the receiver is re-established for an equalization of pressure, and the receiver is re-evacuated, if required.

In this way the specimen to be embedded may be pretreated where this is required, without need for an interruption of the operation and a breaking of the vacuum. The three-way cock 10 can open the conduit 9 and block the conduit 11 or can connect the latter to that portion 9' of conduit 9 which opens into the pipe 3' while blocking the other portion 9".

While a single smaller container is disclosed as disposed within the larger evacuable receiver, a plurality of smaller containers may be disposed within such receiver, each of such containers having a feeder associated therewith. The smaller container disposed within the receiver may also be provided with a wall portion of a material which is permeable to ultraviolet radiation.

As shown in the drawings, the wall of this smaller container is formed of a material which is permeable to ultraviolet radiation, and receiver 1 is provided with an ultraviolet radiation permeable wall portion or window 12 adjacent the smaller container.

Other means and measures which are conventional in freeze-drying processes may be employed. For instance, the small container and particularly the specimen carrier may be adapted to be cooled or heated. The addition or condensation polymerization of the embedding material may be promoted by conventional or known measures, e.g., by the use of a small container which consists of a material that is permeable to ultraviolet radiation if the addition or condensation polymerization reaction is to be promoted by short-wave radiation.

Regarding the treatment of the specimens in the embedding chamber, a good adherence between the embedding medium and the specimen is essential if coherent thin slices are to be obtained. It has been attempted to improve the adherence by an addition of chemicals to the embedding medium or by a chemical pretreatment of the specimens. The chemical pretreatment often results in injury to the specimen because it is difficult to control the amount of the pretreatment. A practice which is generally applicable and superior in effect to the other processes is the treatment with activated gases before the embedding. An action of such gases for a short time, of seconds or minutes, results in a very considerable increase of the adherence of the embedding media. With organic substances, the action of activated oxygen results in a formation of radicals and an incorporation of functional groups such as OH, COH, COOH. This process takes place also at ordinary temperature and may be carried out even at low temperatures, such as $-40°$ C. With such treatment, changes in structure are avoided and the action takes place only at the surface.

It has been found satisfactory to employ gas discharges for exciting the molecules. Gas discharges are desirably maintained at a pressure of $10^{-2}$ to $10^{-3}$ mm. mercury.

The embedding chamber has the advantage that gases can be introduced into the chamber so that a pressure which is slightly higher than in the surrounding receiver can easily be obtained. For this purpose, the cover is not entirely sealed when freeze-drying has been effected. As a result, the pressure can easily be adjusted to that range which is desired for the maintenance of a stable gas discharge. It is desirable to use a high frequency discharge; for this purpose, the embedding chamber is surrounded by an annular electrode. Annular electrode 13 is operatively connected with a source of electrical energy 15 which is also connected with a counter electrode 14 disposed outwardly of the receiver. All these processes comprising freeze-drying, activating, and embedding may be carried out in a single operation.

What is claimed is:

1. Apparatus for producing embedded specimens particularly for examination by an optical or electron microscope, comprising an evacuable receiver, at least one substantially smaller container disposed within said receiver and adapted to hold a specimen to be embedded, a removable cover for said smaller container, means for moving said removable cover into and out of vacuum sealing relationship with said smaller container from the exterior of said evacuable receiver, and at least one feeder for the embedding media opening into said container and being vacuum sealed with respect thereto during operation of the apparatus.

2. Apparatus as set forth in claim 1, characterized in that said smaller container comprises a surface for supporting the specimen and said surface is provided with temperature control means.

3. Apparatus as set forth in claim 1, characterized in that said smaller container is provided with a plurality of feeders, at least one of which supplies a gaseous fluid.

4. Apparatus as set forth in claim 1, characterized in that said feeders consist of pipes.

5. Apparatus as set forth in claim 1, characterized in that the feeders consist of concentric pipes, each of which serves for an independent supply of a fluid.

6. Apparatus as set forth in claim 5, characterized in that said concentric pipes are connected to a reservoir which contains embedding medium, one of the two pipes opening into the reservoir through the bottom thereof and the other pipe opens into the reservoir through the top thereof.

7. Apparatus as set forth in claim 1, characterized in that the smaller container includes a wall portion of a material which is permeable to ultraviolet radiation.

8. Apparatus as set forth in claim 1, characterized in that said smaller container is surrounded by an annular electrode for applying a high frequency discharge.

9. Apparatus as set forth in claim 1 wherein said removable cover is carried by said feeder and vacuum sealed with respect thereto, said feeder being movable from the exterior of said receiver.

References Cited

UNITED STATES PATENTS

| | | | |
|---|---|---|---|
| 2,256,171 | 9/1941 | Ruska | 250—49.5 |
| 2,347,965 | 5/1944 | Ramberg | 250—49.5 |
| 2,417,110 | 3/1947 | Hillier | 250—49.5 |
| 2,585,825 | 2/1952 | Nyrop | 34—5 X |
| 3,300,332 | 1/1967 | Gorham et al. | 118—48 X |
| 3,400,687 | 9/1968 | Lueck | 118—49 X |

FOREIGN PATENTS 260,572  6/1967  Australia.

WILLIAM F. LINDQUIST, Primary Examiner

U.S. Cl. X.R.

350—95; 356—36